Feb. 17, 1959
C. E. PURVIANCE
2,873,534
RUBBER BASE TEMPLET
Filed Nov. 14, 1956
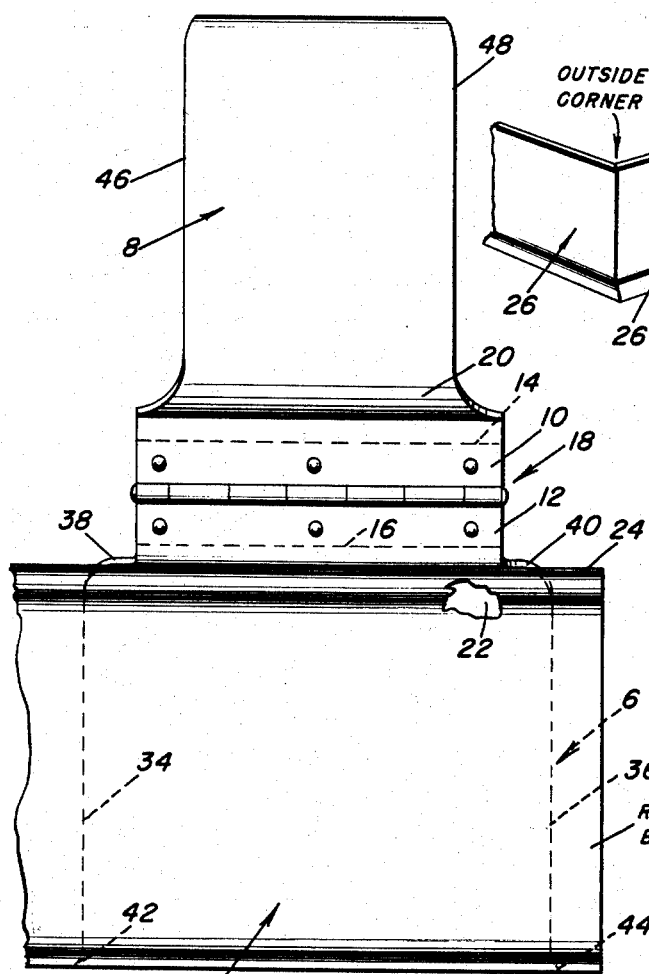
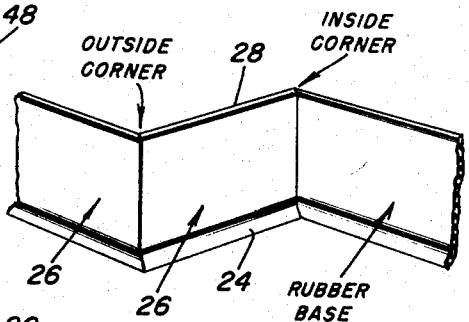
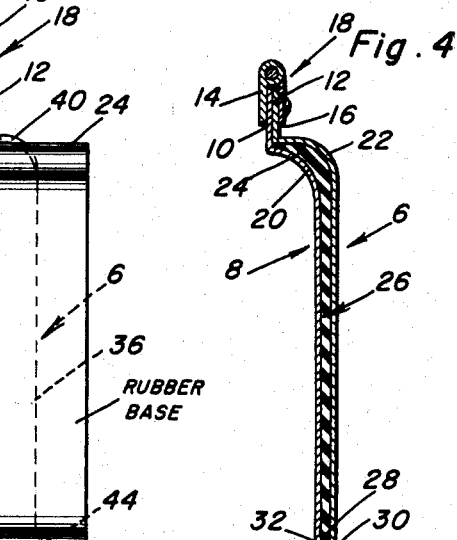
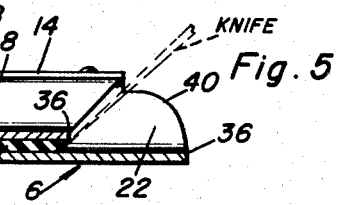
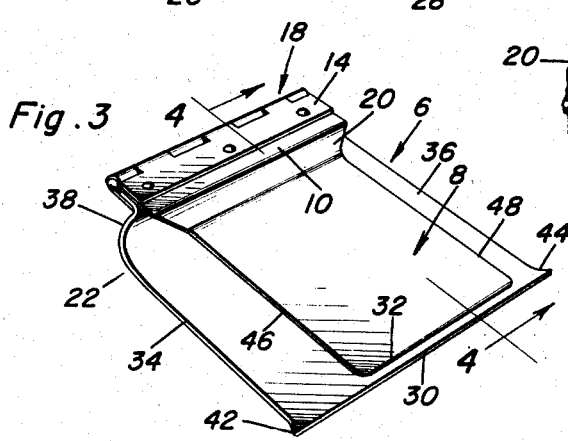
Clarke E. Purviance
INVENTOR.

United States Patent Office 2,873,534
Patented Feb. 17, 1959

2,873,534

RUBBER BASE TEMPLET

Clarke E. Purviance, Eugene, Oreg., assignor of forty percent to David F. Lentz, Eugene, Oreg.

Application November 14, 1956, Serial No. 622,173

3 Claims. (Cl. 33—174)

This invention relates to a novel and practical hand-type templet which is expressly, although not necessarily, constructed and designed for reliably holding an end portion of a strip or piece of molded or equivalently fabricated rubber base in such a manner that the user thereof may lay out, miter or otherwise prepare one or both ends of the base so that it will be accurately readied for either inside or outside corner joint installation requirements.

It is a matter of common knowledge that kitchens, bathrooms, office spaces and the like lend themselves to appropriate use of prefabricated rubber or composition base strips having prescribed upper and lower lip flanges or the like. Some workmen who are called upon to install rubber base strips resort to a rather crude procedure of gouging, scraping or otherwise cutting out the back of the rubber base to thin it sufficiently that it may be bent to provide a corner. Others scribe the base with a compass or divider before cutting the base to make a square inside corner and use an underscriber for making an outside corner.

The present invention is offered as an advance in the art in that it renders commonly employed methods of corner-cutting obsolete. To this end a simple, expedient and economical clamp-type template for one-handed use is utilized. Not only does its use result in a saving of time, it makes possible the provision of accurately cut and formed miter joints and ensures a neat and highly satisfactory corner.

In carrying out the principles of the invention a highly economical and easy-to-use templet is provided. Not only this, the invention features a construction which is so designed that right-hand and left-hand properly butted edges or inside as well as outside corners are effectually obtainable.

More specifically, the invention pertains to a hand-type templet which is characterized by companion co-operating plates. Corresponding marginal edge portions of the plates are hingedly connected together permitting the plates to be opened and closed and, when closed, to assume superimposed relationship to the end that the end portion of the rubber base may be aptly sandwiched and firmly held between the plates. The plates also feature left hand and right hand guiding edges of pre-scribed and requisite delineation and which when traced by a cutting knife or scriber make it easily possible to scribe or otherwise prepare the edge and the ultimate miter joints.

Novelty is also predicated on the construction set forth above and wherein, in addition, the upper or top plate is centered on the bottom plate and is narrower than the bottom plate to achieve the desired end results as intended and in a highly satisfactory manner.

Other objects, features and advantages will become more readily apparent from the following description and the accompanying sheet of illustrative, but not restrictive, drawings.

In the drawing wherein like numerals are employed to designate like parts throughout and views:

Figure 1 is a plan view of the improved template showing the hingedly mounted plates in what may be referred to as open relationship and also showing a fragmentary portion of the rubber base resting atop the bottom plate in readiness for scribing or cutting as the case may be;

Figure 2 is a perspective view showing the aforementioned inside and outside corners and how they appear when finished;

Figure 3 is a perspective view, on a smaller scale, showing the templet with the plates one atop the other;

Figure 4 is a section on the line 4—4 of Figure 3 with the rubber base sandwiched between the plates and illustrating the conforming shape of the plates; and Figure 5 is a fragmentary sectional view intended to show how a cutting knife may be used to undercut the rubber base when scribing or mitering the same for inside corner use.

Referring now to the drawings it will be seen that the plates are generally rectangular in form. The bottom or lower plate, the larger one, is denoted by the numeral 6 and the companion top or upper plate is denoted at 8. As before mentioned the top plate is centered in relation to the upper or obverse side of the lower plate and is narrower than the lower plate. Corresponding portions 10 and 12 (Figure 4) are flat and directly superimposed on each other and are secured together by the cooperating leaves 14 and 16 of the suitable plate assembling and connecting hinge 18. The portions of the plates adjacent to the hinge are curved or bent to define what may be conveniently referred to as concavo-convex portions 20 and 22 which are obviously utilized to conform with the feather-edged lip flange 24 of the rubber base or equivalent strip material 26. The other curved lip flange 28 also requires the shaping of the cooperating or contacting portions of the plates 6 and 8, that is, the free swingable edge portions 30 and 32 remote from the hinged connection. The guiding edges at the right and left of the bottom plate 6 are denoted generally by the numerals 34 and 36 respectively, the edge 34 being for a left-hand cut and the other edge 36 for a right-hand cut. Rounded shoulders 38 and 40 provide portions of the guiding edges adjacent to the concavo-convex portions 20 and 22 of the plate. Then too, the guiding edges are suitably contoured at their outer free swingable ends as at 42 and 44.

The same principle of formation or construction is employed in connection with the top plate 8. Here the left hand guiding edge is denoted generally by the numeral 46 and the other or right-hand edge by the numeral 48. These edges have proper delineation too.

Generally speaking, the invention is used by inserting a strip of rubber base in the templet, that is between the top and bottom plates 6 and 8 in the manner shown in Figures 1, 4 and 5. The rubber base strip is then positioned so that it may be pressed and clamped and held in one hand to make the cut with the knife in the manner depicted in Fig. 5. Inside corner cuts are made by cutting the rubber base along the edge of the larger plate using the proper edge to obtain either the right-hand or left-hand cut needed. Outside corners are made similarly by using the narrower plate 8.

More specifically, to cut an outside corner place 4 inch rubber base in templet well in place, then close the narrow half, hold firm in hand and cut at 45° angle cutting all the way through. Or mark by tracing along edge of the inside half of the templet. Then remove and cut on layout mark at 45° angle.

To cut inside corner only one piece is cut to complete the corner. The only cut, either right or left hand, is made in the same manner as the outside corner except that the cut is made along the outside of the templet. After this cut is made, remove and trim the convex part of the base so that it will sit on the concave of other piece of base to complete inside corner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use in clamping and releasably holding an end portion of a strip of a piece of molded rubber or composition base in a given position while enabling a user to lay out, miter, and otherwise fashion the terminal of said base for ready inside or outside corner-joint installation requirements a hand-type templet comprising a pair of plates generally rectangular and essentially flat superimposed one on the other and hingedly connected together and functioning to permit the end portion of said base to be sandwiched between the plates and clampingly held with one hand, the respectively opposite marginal end portions of said plates being formed with selectively usable spaced parallel left and right implement guiding edges primarily straight, as required, the top plate being narrower than the underlying bottom plate and centered on the bottom plate with its guiding edges spaced inwardly from the respective guiding edges on said bottom plate, the mating faces of said plates being contoured so that one face conforms to one face of the base and the other face conforms to the other face of said base, said top plate having marginal edges which are shaped to give an outside corner and the bottom plate having edges shaped to give an inside corner cut.

2. The structure defined in claim 1, and wherein the portions of said plates adjacent to the hinged connection are both concavo-convex in shape and are thus conformingly nested together when in use and conform to that portion of the base which is intimately and conformably clasped therebetween, the free swingable edge portions of said plates being contoured and shaped to match the contour and shape of the edge and surface portions of the part of the base which is sandwiched between said free swingable edge portions.

3. For use in clamping and releasably holding an end portion of a strip of molded rubber or composition base in a given position while enabling a user to lay out, miter, and otherwise fashion the terminal of said base for ready inside or outside corner-joint installation requirements, a hand-type templet comprising a generally flat bottom plate adapted to give an inside corner cut and having spaced parallel marginal edges for guiding a scribing tool or a cutting knife, one marginal edge portion of said bottom plate being formed with a flange disposed in a plane above but parallel to the plane of the plate proper, and the intervening portion being concavo-convex, a companion top plate adapted to give an outside corner cut and centered in relation to the upper surface of said bottom plate and narrower than the bottom plate and also primarily flat, said top plate having a marginal flange corresponding to the flange of said bottom plate and the flanges being disposed together and connected between the leaves of an assembling and connecting hinge, the edge portions of the plates opposite to the hingedly connected flanges being free and generally straight across, the corner portions of the top plate being rounded and the free edge thereof being formed with a curved lip to conform to a cooperating surface of the base material when the latter is sandwiched between said plates, the left and right marginal edges of said top plate being likewise straight and parallel and usable in guiding a cutting knife or scribing tool, the cooperating mating faces of said plates being contoured so that one face conforms to one face of the base and the other face conforms to the other face of the base.

References Cited in the file of this patent
UNITED STATES PATENTS

| | | |
|---|---|---|
| 533,792 | Donovan | Feb. 5, 1895 |
| 684,142 | Ward | Oct. 8, 1901 |
| 1,469,395 | Richard | Oct. 2, 1923 |
| 2,509,441 | MacAllan | May 30, 1950 |
| 2,560,756 | Bollons | July 17, 1951 |
| 2,777,487 | Potts | Jan. 15, 1957 |